United States Patent
Sekido (10) Patent No.: US 7,864,677 B2
(45) Date of Patent: Jan. 4, 2011

(54) POLICER DEVICE AND BANDWIDTH CONTROL

(75) Inventor: Mami Sekido, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 12/285,693

(22) Filed: Oct. 10, 2008

(65) Prior Publication Data
US 2009/0207729 A1 Aug. 20, 2009

(30) Foreign Application Priority Data
Feb. 15, 2008 (JP) .............................. 2008-034500

(51) Int. Cl.
*H04J 3/16* (2006.01)
(52) U.S. Cl. ................... 370/231; 370/395.2; 370/468
(58) Field of Classification Search ................ 370/230, 370/235, 236, 412; 709/236, 240
See application file for complete search history.

(56) References Cited

U.S. PATENT DOCUMENTS

| 7,058,063 | B1 | 6/2006 | Cavendish | |
| 7,711,005 | B1* | 5/2010 | Sindhu et al. | 370/468 |
| 2002/0004379 | A1* | 1/2002 | Gruhl et al. | 455/403 |
| 2008/0033908 | A1* | 2/2008 | Cooper et al. | 707/2 |
| 2009/0193144 | A1* | 7/2009 | Zeitak | 709/240 |

FOREIGN PATENT DOCUMENTS

| JP | 11-55292 | 2/1999 |
| JP | 2001-7822 | 1/2001 |
| JP | 2006-173726 | 6/2006 |

* cited by examiner

*Primary Examiner*—Seema S Rao
*Assistant Examiner*—Henry Baron
(74) *Attorney, Agent, or Firm*—Fujitsu Patent Center (57) ABSTRACT

A frame input/output unit allows a frame to pass according to directions output by a flag judging unit while consuming resources. A resource managing unit manages amounts of resources supplied and consumed. A management information storage unit stores passing information indicating policers that have passed frames during each period and management information including flag information on skip flags and the like. A flag updating unit catalogs a resource surplus flag and a supply filled flag at the end of a previous period and a skip flag that indicates whether a self-policer skips consuming resources in the following period based on the passing information in the previous period and the current period. The flag judging unit refers to a latest skip flag and judges the presence or absence of frame passing in the following period.

12 Claims, 7 Drawing Sheets

| | PASSING INFORMATION IN CURRENT PERIOD | | | PASSING INFORMATION IN PREVIOUS PERIOD | | | SKIP FLAG | RESOURCE SURPLUS FLAG | SUPPLY FILLED FLAG |
|---|---|---|---|---|---|---|---|---|---|
| | POLICER 200-1 | ... | POLICER 200-n | POLICER 200-1 | ... | POLICER 200-n | | | |
| 1 | 1 | ... | 1 | 0 | ... | 0 | 0 | 1 | 1 |
| 2 | 0 | | 0 | 0 | | 1 | 1 | 0 | 0 |
| ⋮ | | | | ⋮ | | | | | |

| | PASSING INFORMATION IN CURRENT PERIOD | | | PASSING INFORMATION IN PREVIOUS PERIOD | | | SKIP FLAG | RESOURCE SURPLUS FLAG | SUPPLY FILLED FLAG |
|---|---|---|---|---|---|---|---|---|---|
| | POLICER 200-1 | ... | POLICER 200-n | POLICER 200-1 | ... | POLICER 200-n | | | |
| 1 | 1 | ... | 1 | 0 | ... | 0 | 0 | 1 | 1 |
| 2 | 0 | ... | 0 | 0 | ... | 1 | 1 | 0 | 0 |
| ... | | | | | | | | | |

POLICER DEVICE AND BANDWIDTH CONTROL

CROSS-REFERENCE TO RELATED APPLICATIONS

This application is based upon and claims the benefit of priority of the prior Japanese Patent Application No. 2008-034500, filed on Feb. 15, 2008, the entire contents of which are incorporated herein by reference.

BACKGROUND

1. Field

The present invention relates to a policer device and a bandwidth control.

2. Description of the Related Art

In recent years, for example, in a relay device such as a layer 2 switch (hereinafter, "L2 switch"), quality of service (QoS) control that controls the priority of frame relay depending on the quality required for frames to be relayed is sometimes carried out. In such a relay device, as disclosed, for example, in Japanese Patent Application Laid-open Publication No. 2006-173726, policers that carry out polishing on an input side and shapers that carry out shaping on an output side are sometimes provided.

Figure 9:
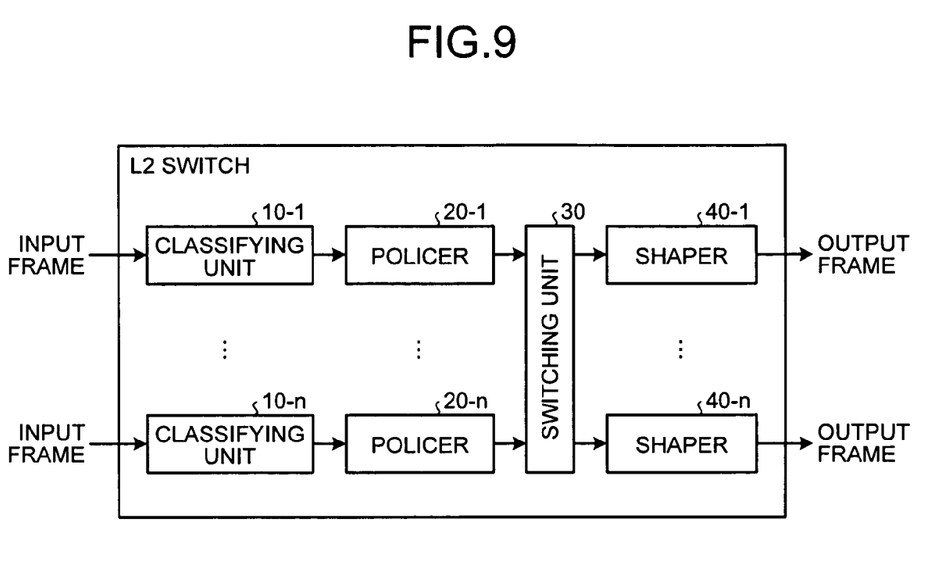
FIG. 9 is a block diagram of a schematic configuration of an L2 switch.

FIG. 9 is a block diagram of a schematic configuration of a common L2 switch provided with policers and shapers. The L2 switch shown in FIG. 9 is provided with n ports (n is an integer equal to or larger than two) and has classifying units 10-1 to 10-$n$, policers 20-1 to 20-$n$, and shapers 40-1 to 40-$n$ corresponding to the respective ports.

Input frames input from the respective ports of the L2 switch are classified into classes by the respective classifying units 10-1 to 10-$n$ according to the priority and output to the respective policers 20-1 to 20-$n$. The frames are bandwidth controlled by the respective policers 20-1 to 20-$n$ and output to a switching unit 30. At this time, the policers 20-1 to 20-$n$ are supplied with resources generally called token or the like for bandwidth control with a predetermined period. Each of the policers 20-1 to 20-$n$ performs bandwidth control according to classes of the frames by outputting the frames in the range of accumulated resources while consuming the resources.

The frames output from the policers 20-1 to 20-$n$ are output by the switching unit 30 to the shapers 40-1 to 40-$n$ that correspond to the respective ports according to the respective destination addresses of the frames and bandwidth controlled by the respective shapers 40-1 to 40-$n$, followed by being output as output frames from the respective ports.

Generally, a plurality of policers provided in a relay device are supplied with resources for bandwidth control with the respective independent periods. That is, for example, in the L2 switch shown in FIG. 9, the policers 20-1 to 20-$n$ are supplied with resources at their timings different from one another. In addition, when a frame is output from any of the policers, resources for the other policers are consumed, which gives rise to a problem that only part of the policers always pass frames depending on the difference in resource supply timings.

Specifically, for example, in FIG. 9, when a resource supply timing for the policer 20-1 is earlier than those for the other policers 20-2 to 20-$n$, the policer 20-1 monopolizes resources prior to the resource supply timings for the other policers 20-2 to 20-$n$. Moreover, when the policer 20-1 consumes a large amount of resources while monopolizing the resources, the amount of the resources for the policers 20-2 to 20-$n$ drops to smaller than zero before the resource supply timings for the policers 20-2 to 20-$n$ come, and unless the amount of the resources for the policers 20-2 to 20-$n$ recovers to equal to or larger than zero even when resources are supplied at their resource supply timings, the policers 20-2 to 20-$n$ cannot pass any frames.

After this, when the next resource supply timing for the policer 20-1 comes, the policer 20-1 again monopolizes the resources and passes a frame, thereby exhausting the resources that the other policers 20-2 to 20-$n$ are supposed to be able to consume. Because of the exhaustion of the resources, the policers 20-2 to 20-$n$ have to discard frames, whereas the policer 20-1 monopolizes the resources newly supplied and passes new frames one after another.

In this way, since a resource supply timing for each policer is independent, the fairness to frame passing is not insured. Even though users who transmit frames pay for the same charge to their communications services corporation, the same bandwidth is sometimes not ensured in the relay device.

SUMMARY

It is an object of the present invention to at least partially solve the problems in the conventional technology.

According to an aspect of an embodiment, a policer device includes a storage unit that stores passing information indicating whether each of the own policer and other policer device has passed a frame in each period between resource supply timings specific to the own policer; a managing unit that manages changes in an accumulation amount of resources consumed when the own policer or the other policer device passes a frame; a determining unit that determines whether frame passing by the own policer is allowed in a following period after a next resource supply timing based on at least either of the passing information stored by the storage unit or the change in the accumulation amount of resources managed by the managing unit; and an output unit that outputs a frame input to the own policer in each period between resource supply timings according to the determination made by the determining unit.

According to another aspect of an embodiment, a method is for controlling a bandwidth in a first policer device provided in a same device together with a second policer device. The method includes obtaining passing information indicating whether each of the first policer and the second policer has passed a frame in each period between resource supply timings specific to the first policer; obtaining a change in an accumulation amount of resources consumed when the first policer or the second policer passes a frame; determining whether frame passing by the first policer is allowed in a following period after a next resource supply timing based on the passing information or the change in the accumulation amount of resources; and outputting the frame input to the first policer in the following period between resources supply timings according to at the determining.

According to still another aspect of an embodiment, a computer program product causes a computer to perform the method according to the present invention.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

The essence of the present invention is that a policer having passed a frame is restricted to consume resources after a next resource supply timing and yields the resources to another policer. Hereinafter, an embodiment of the present invention will be explained in detail with reference to the accompanying drawings.

Figure 1:
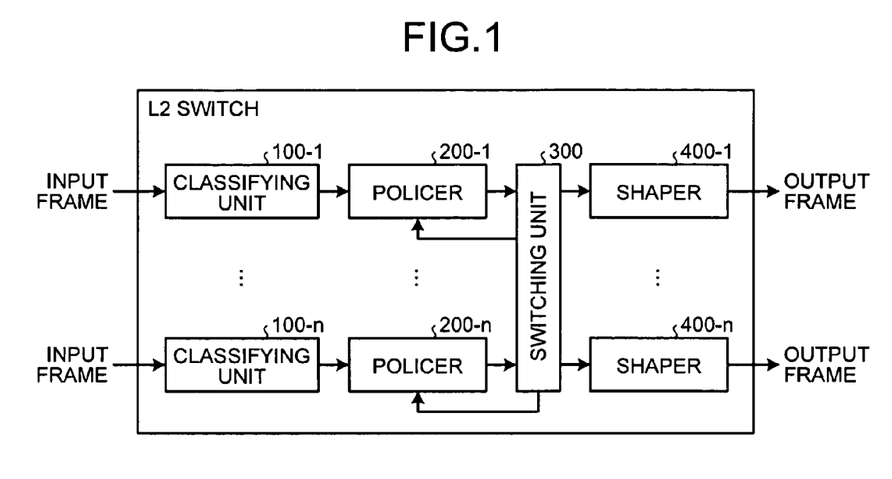
FIG. 1 is a block diagram of a schematic configuration of an L2 switch according to an embodiment.

FIG. 1 is a block diagram of a schematic configuration of an L2 switch according to the embodiment of the present invention. The L2 switch shown in FIG. 1 includes classifying units 100-1 to 100-*n*, policers 200-1 to 200-*n*, a switching unit 300, and shapers 400-1 to 400-*n*.

The classifying units 100-1 to 100-*n* are connected to the respective separate ports and receive frames input from the ports. The classifying units 100-1 to 100-*n* classify the frames into classes according to the priority and output them to the respective policers 200-1 to 200-*n*.

The policers 200-1 to 200-*n* bandwidth control the frames and pass them while consuming resources supplied at their respective independent resource supply timings. When resources necessary for passing frames are exhausted, the policers 200-1 to 200-*n* discard the frames output from the respective classifying units 100-1 to 100-*n*. Further, when the respective resource supply timings come, each of the policers 200-1 to 200-*n* updates a skip flag that indicates whether a frame is passed during the time before the following resource supply timing comes and determines whether the frame is passed with reference to the updated skip flag. At this time, each of the policers 200-1 to 200-*n* obtains passing information indicating whether the self-policer (the own policer) and another policer have passed the frames from the switching unit 300 and updates a skip flag such that each policer passes a frame fairly. The configuration and the operation of the policers 200-1 to 200-*n* are described in detail later.

The switching unit 300 outputs the frames to the shapers 400-1 to 400-*n* connected to the respective ports corresponding to the respective destination addresses of the frames. The switching unit 300 outputs to each of the policers 200-1 to 200-*n* passing information in which the policers 200-1 to 200-*n* having passed the output frames can be identified.

The shapers 400-1 to 400-*n* are connected to the respective separate ports and output the frames output from the switching unit 300 via the respective ports while bandwidth controlling them. At this time, the shapers 400-1 to 400-*n* queue the frames as necessary to delay them so as not to exceed a predetermined bandwidth, and output all the frames from the ports. In other words, the shapers 400-1 to 400-*n* do not discard any frames.

Figure 2:
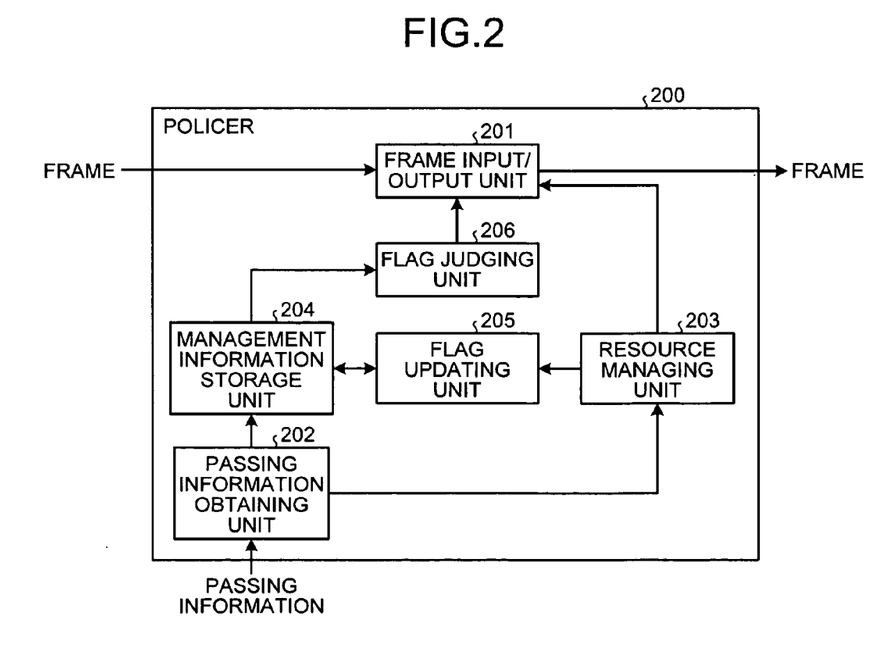
FIG. 2 is a block diagram of a configuration of an essential part of a policer according to the embodiment.

FIG. 2 is a block diagram of a configuration of an essential part of a policer 200 according to the present embodiment. The policer 200 shown in FIG. 2 includes a frame input/output unit 201, a passing information obtaining unit 202, a resource managing unit 203, a management information storage unit 204, a flag updating unit 205, and a flag judging unit 206. Note that the policers 200-1 to 200-*n* shown in FIG. 1 have the same configuration as that of the policer 200 shown in FIG. 2.

The frame input/output unit 201 allows a frame output from the corresponding classifying unit to pass according to the directions output by the flag judging unit 206 while consuming the resources managed by the resource managing unit 203. That is, the frame input/output unit 201 allows a frame to pass when an accumulation amount of the resources managed by the resource managing unit 203 is larger than zero and passing the frame is permitted by the flag judging unit 206. Note that an amount of resources consumed by frame passing permitted by the frame input/output unit 201 differs depending on the size of the frame. When a frame is large, the amount of resources consumed is large, and on the other hand, when a frame is small, the amount of resources consumed is small.

Every time when a frame is output by the switching unit 300, the passing information obtaining unit 202 obtains from the switching unit 300 passing information indicating the size of the frame and a policer that has passed the frame. The passing information obtaining unit 202 refers to the obtained passing information and posts the size of the frame to the resource managing unit 203 and also posts the policer that has passed the frame to the management information storage unit 204.

The resource managing unit 203 manages an amount of resources supplied to and consumed by the policer 200. That is, when resources are supplied to the policer 200 at a resource supply timing specific to the policer 200, the resource managing unit 203 increases the accumulation amount of resources for the policer 200 by the amount of resource supplied. When the policer 200 or another policer passes a frame, the resource managing unit 203 decreases the accumulation amount of the resources for the policer 200 by the amount of resource consumed.

Figure 3:
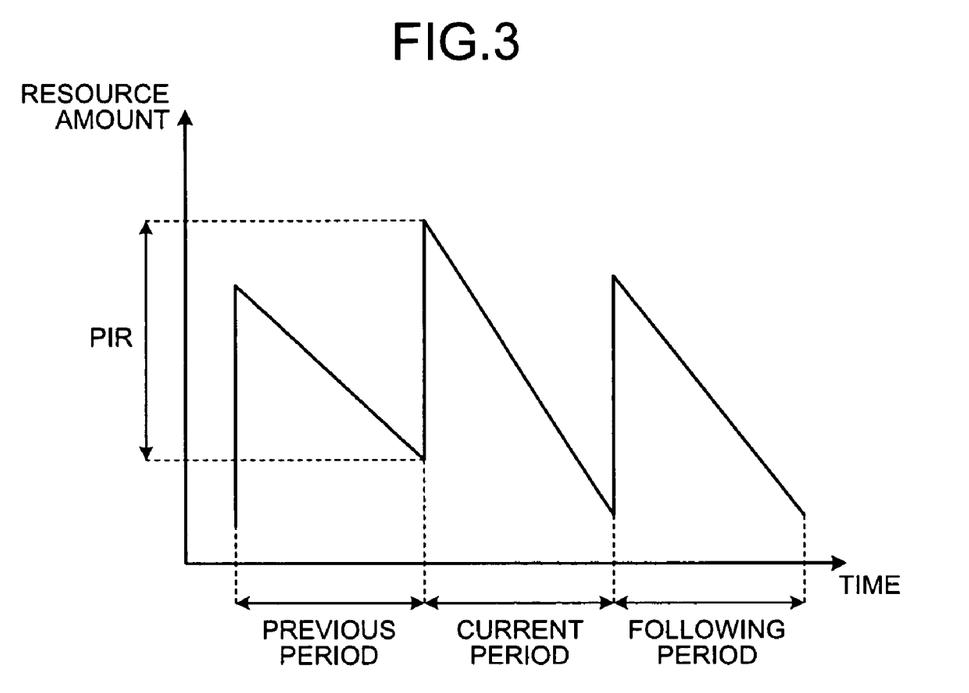
FIG. 3 is a chart of an example of variation of an accumulation amount of resources according to the embodiment.

More specifically, the resource managing unit 203 manages an accumulation amount of resources that varies as shown, for example, in FIG. 3. In other words, a resource supply timing for the policer 200 comes with a predetermined period, and if each period between resource supply timings is designated as a previous period, a current period, or a following period in time series, an accumulation amount of resources managed by the resource managing unit 203 increases by a constant peak information rate (PIR) at each resource supply timing between the periods. Further, the accumulation amount of resources managed by the resource managing unit 203 is gradually decreased during each period by passing a frame by the policer 200 or another policer.

Figure 4:
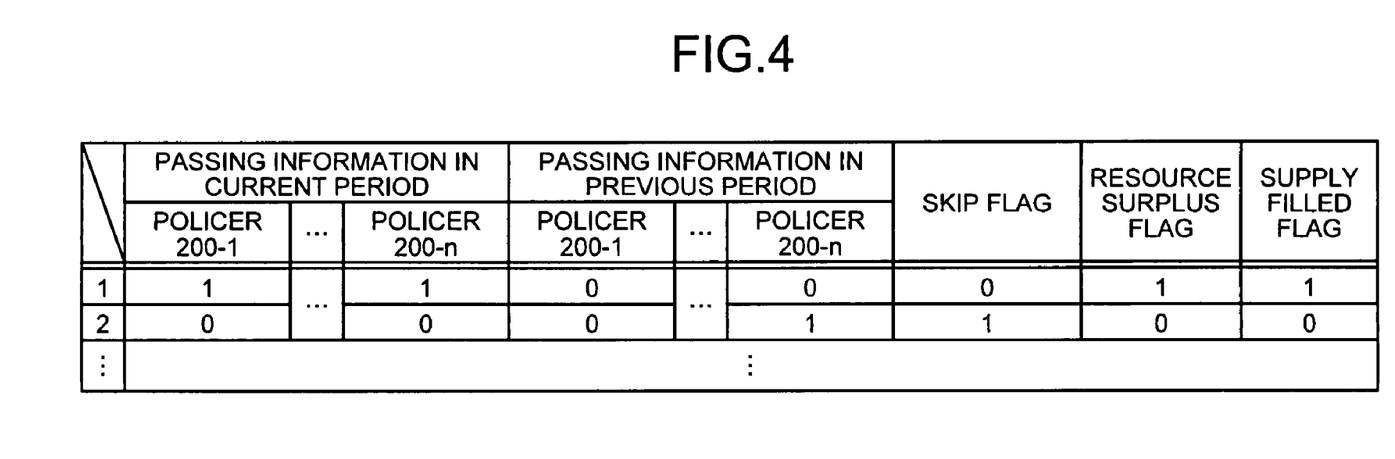
FIG. 4 is a table of an example of management information table according to the embodiment.

The management information storage unit 204 stores management information including passing information indicating policers that have passed frames during each period and flag information such as skip flags. More specifically, the management information storage unit 204 has, for example, as shown in FIG. 4, passing information on whether all the policers including the self-policer 200 passed frames in a current period and in a previous period and a management information table storing skip flags, resource surplus flags, and supply filled flags. This management information table stores not only passing information and flag information at the present time but also passing information and flag information in the past.

In FIG. 4, the passing information in the current period and the passing information in the previous period indicate policers with "1" that passed frames in the current period and the previous period and policers with "0" that did not pass any frames in these periods. These pieces of passing information can be cataloged by posting the policers having passed the frames from the passing information obtaining unit 202 to the management information storage unit 204. Further, a skip flag indicates whether the self-policer 200 skips consuming resources in the following period. That is, when the self-policer 200 skips consuming resources for passing a frame in the following period, the skip flag is designated as "1", and when the self-policer 200 is allowed to consume resources for passing the frame in the following period, the skip flag is designated as "0".

Further, a resource surplus flag indicates whether there are surplus resources consumable by the self-policer 200 at the end of the current period. That is, when the accumulation amount of resources managed by the resource managing unit 203 is larger than zero at the end of the current period, the resource surplus flag is designated as "1", and when the accumulation amount of resources managed by the resource managing unit 203 is equal to or smaller than zero at the end of the current period, the resource surplus flag is designated as "0". Furthermore, a supply filled flag indicates whether resources consumable by the self-policer 200 in the following period remains by being supplied with resources at a resource supply timing between the current period and the following period. In other words, when the accumulation amount of resources managed by the resource managing unit 203 becomes larger than zero after resources are supplied, the supply filled flag is designated as "1", and when the accumulation amount of resources managed by the resource managing unit 203 is equal to or smaller than zero even after the resources are supplied, the supply filled flag is designated as "0".

The flag updating unit 205 updates the skip flag, the resource surplus flag, and the supply filled flag stored by the management information storage unit 204 based on the accumulation amount of resources managed by the resource managing unit 203 and the passing information and the flag information stored by the management information storage unit 204. More specifically, the flag updating unit 205 judges whether the accumulation amount of resources is larger than zero at the end of each period and newly catalogs a resource surplus flag at the end of each period based on the judgment result. In addition, the flag updating unit 205 judges whether the accumulation amount of resources becomes larger than zero after resources are supplied at the end of each period and newly catalogs a supply filled flag at the end of each period based on the judgment result.

Further, the flag updating unit 205 newly catalogs a skip flag that indicates whether the self-policer 200 skips consuming resources in the following period based on the resource surplus flag and the supply filled flag at the end of the previous period and the passing information in the previous period and the current period. At this time, the flag updating unit 205 designates the skip flag as "1" in case that the self-policer 200 has passed a frame in the current period, there are some policers that have not passed any frames by the current period, and the resource surplus flag indicates that resources did not remain at the end of the previous period.

This means that when the self-policer 200 has passed the frame in the current period, the self-policer 200 yields resources to another policer in the following period because there is a possibility that another policer cannot pass a frame in the current period owing to the resource consumption by the self-policer 200. However, in case that all the policers have passed frames by the current period, each of the policers is assumed to have passed the frame fairly, and therefore, it is not necessary for the self-policer 200 to yield resources to another policer in the following period. Further, when resources remained at the end of the previous period and even if other policers do not pass frames in the current period, it is assumed that the other policers do not have any frames to pass in the first place. Accordingly, yielding the resources to another policer by the self-policer 200 is not necessary in the following period.

In this manner, the flag updating unit 205 determines whether the self-policer 200 yields resources to another policer in the following period such that each policer passes a frame fairly, and when the self-policer 200 yields the resources to another policer, the flag updating unit 205 newly catalogs a skip flag "1" at the end of the current period. Note that the update processing for a flag by the flag updating unit 205 will be described in detail later.

The flag judging unit 206 refers to the latest skip flag stored in the management information storage unit 204. When the skip flag is "0", the flag judging unit 206 permits the frame input/output unit 201 to pass a frame, and when the skip flag is "1", the flag judging unit 206 prohibits the frame input/output unit 201 from passing a frame.

Figure 5:
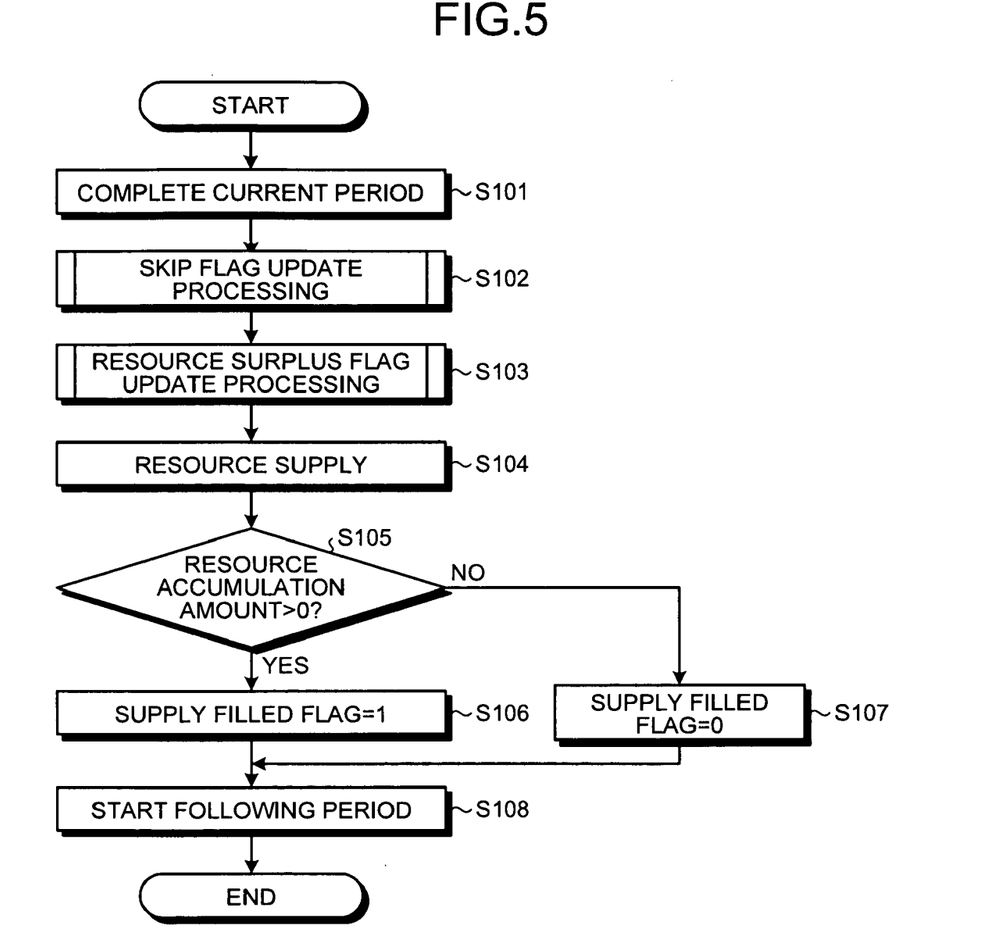
FIG. 5 is a flow chart of an operation of the policer at a resource supply timing according to the embodiment.

Next, an operation of the policer 200 configured as described above at a resource supply timing will be explained with reference to the flow chart shown in FIG. 5. Hereinafter, a method of bandwidth control that controls a bandwidth in a following period based on a flag updated at a resource supply timing between a current period and a following period will be explained.

While the self-policer 200 or another policer passes a frame, the passing information obtaining unit 202 obtains the passing information and catalogs the accumulation amount of resources in the resource managing unit 203 and the passing information in the current period in the management information storage unit 204. When a resource supply timing for the self-policer 200 comes and the current period is completed (step S101), skip flag update processing is carried out by the flag updating unit 205 (step S102).

The skip flag update processing is carried out based on the passing information in the previous period and the current period, the resource surplus flag at the end of the previous period, and the supply filled flag at the end of the previous period (that is, at the beginning of the current period). This skip flag update processing will be described in detail later.

The flag updating unit 205 performs resource surplus flag update processing according to whether there is a surplus accumulation amount of resources in the resource managing unit 203 at the end of the current period (step S103). This resource surplus flag update processing will also be described in detail later.

When the skip flag and the resource surplus flag stored in the management information storage unit 204 are updated, resources are supplied to the self-policer 200 by a constant PIR (step S104), and the accumulation amount of resources stored in the resource managing unit 203 is increased by the PIR. Then, the flag updating unit 205 judges whether the accumulation amount of resources after the resources are supplied is larger than zero (step S105). When the accumulation amount of resources becomes larger than zero (Yes at step S105), a supply filled flag "1" is newly cataloged in the management information storage unit 204 (step S106). When the accumulation amount of resources is equal to or smaller than zero (No at step S105), a supply filled flag "0" is newly cataloged in the management information storage unit 204 (step S107).

In the manner described above, when the resource supply and the flag updating are completed at the end of the current period, the following period begins (step S108). During the following period, the flag judging unit 206 refers to the updated skip flag. When the skip flag is "0", a frame is passed by the frame input/output unit 201 while the accumulation amount of resources in the resource managing unit 203 is consumed. On the other hand, when the skip flag is "1", the resources are yielded to another policer, and the self-policer 200 does not pass any frame.

Figure 6:
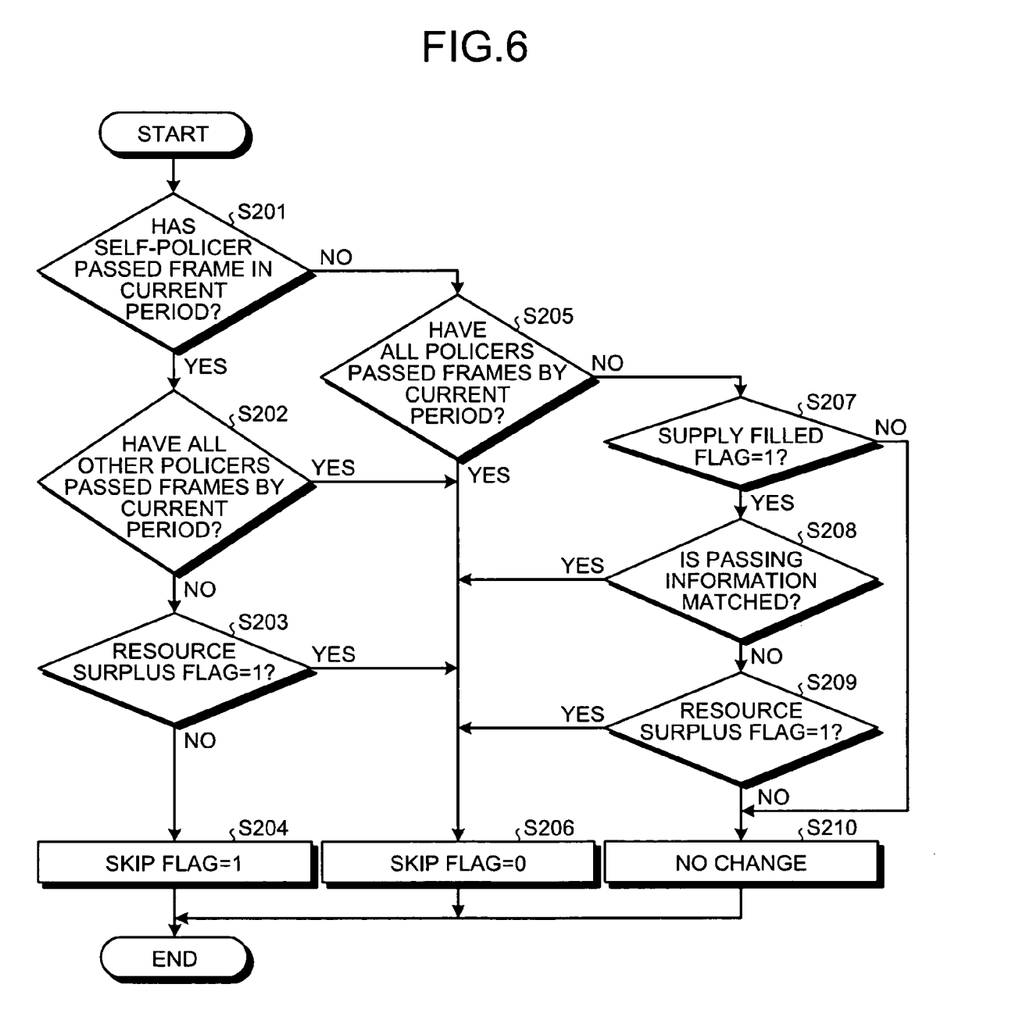
FIG. 6 is a flow chart of skip flag update processing according to the embodiment.

Next, skip flag update processing according to the present embodiment will be explained with reference to the flow chart shown in FIG. 6. The skip flag update processing shown in FIG. 6 is carried out by the flag updating unit 205 when a resource supply timing comes.

First, the flag updating unit 205 refers to the latest passing information in a current period stored in the management information storage unit 204 and judges whether the self-policer 200 has passed a frame in the current period (step S201). From the judgment result, when the self-policer 200 has passed a frame during the current period (Yes at step S201), it may be fair that the self-policer 200 should yield resources to another policer in the following period.

Hence, the flag updating unit 205 refers to the passing information in the current period and the passing information in the previous period and judges whether all the other policers have passed frames by the current period (step S202). From the judgment result, in case that all the other policers have passed frames by the current period (Yes at step S202), it is assumed that all the policers have passed frames fairly, and therefore, yielding resources to another policer by the self-policer 200 in the following period is not necessary, and a skip flag "0" is newly cataloged in the management information storage unit 204 (step S206). Further, when there are some other policers that have not passed any frames by the current period (No at step S202), a possibility exists that some policers were unable to pass frames by the current period because of resource exhaustion.

Hence, the flag updating unit 205 refers to the resource surplus flag at the end of the previous period and judges whether there were surplus resources at the end of the previous period (that is, whether the resource surplus flag is "1") (step S203). From the judgment result, when there were surplus resources at the end of the previous period (Yes at step S203), it is assumed that any frame has not been input to policers in the first place that have not passed any frames by the current period, and therefore, yielding resources to another policer by the self-policer 200 in the following period is not necessary, and thus a skip flag "0" is newly cataloged in the management information storage unit 204 (step S206). Further, when there were not any surplus resources at the end of the previous period (No at step S203), it is assumed that there are some policers that were not able to pass frames by the current period because of exhaustion of the resources, and therefore a skip flag "1" is newly cataloged in the management information storage unit 204 (step S204).

On the other hand, when the self-policer 200 has not passed any frame during the current period (No at step S201), the flag updating unit 205 refers to the passing information in the current period and the passing information in the previous period and judges whether all the policers including the self-policer 200 have passed frames by the current period (step S205). From the judgment result, in case that all the policers have passed frames by the current period (Yes at step S205), all the policers are assumed to have passed frames fairly. Therefore, it is not necessary for the self-policer 200 to yield resources to another policer in the following period, and a skip flag "0" is newly cataloged in the management information storage unit 204 (step S206). Further, in case that all the policers have not passed any frames by the current period (No at step S205), there is a possibility that some policers were not able to pass frames by the current period because of exhaustion of the resources.

At this time, the policer that was unable to pass a frame may be the self-policer 200, and therefore the skip flag "1" is not newly cataloged in the management information storage unit 204. However, the flag updating unit 205 judges whether the supply filled flag is "1" at the end of the previous period (that is, at the beginning of the current period) (step S207). When the supply filled flag is "0" (No at step S207), the same skip flag as that in the previous time is cataloged in the management information storage unit 204 (step S210).

Here, the supply filled flag at the end of the previous period (at the beginning of the current period) being "0" means that a huge frame that consumed a large amount of resources passed through any policer in the previous period, and that the accumulation amount of resources did not recover to a value larger than zero even though resources were supplied at a resource supply timing. Accordingly, in such a case, a skip flag for any policer is not changed, and the current situation is maintained. When the accumulation amount of resources recovers to a value larger than zero, the skip flag is properly updated again.

Further, when the supply filled flag at the end of the previous period (at the beginning of the current period) is "1" (Yes at step S207), the flag updating unit 205 refers to the latest passing information in the current period and the passing information in the previous period and judges whether the policers that passed frames in the current period and the previous period match each other (step S208). From the judgment result, when totally the same policer passed the frames in the current period and the previous period (Yes at step S208), a supply of resources is sufficient, which leads to an assumption that the policer that passed frames in the current period and the previous period is the only policer in use and that the rest of the policers are not in use. Here, since the self-policer 200 has not passed any frame in the current period, the self-policer 200 did not pass any frame in the current period and the previous period, which means that the self-policer 200 is a policer not in use. Since taking the fairness in resource consumption into consideration is not necessary for policers not in use, a skip flag "0" is newly cataloged in the management information storage unit 204 (step S206).

On the other hand, when the policer that has passed a frame in the current period and the policer that passed a frame in the previous period are different from each other (No at step S208), the flag updating unit 205 refers to the resource surplus flag at the end of the previous period and judges whether there were surplus resources at the end of the previous period (that is, whether the resource surplus flag is "1") (step S209). From the judgment result, when there were surplus resources at the end of the previous period (Yes at step S209), it is assumed that frames were not input in the first place to policers that have not passed any frames by the current period, and therefore, yielding resources to another policer by the self-policer 200 in the following period is not necessary, and a skip flag "0" is newly cataloged in the management information storage unit 204 (step S206).

When there were no surplus resources at the end of the previous period (No at step S209), it is assumed that the entire consumption amount of resources is large and that all the policers do not pass frames adequately although the resource supply is sufficient. Accordingly, the same skip flag as that in the previous time is cataloged in the management information storage unit 204 (step S210). In other words, in this case, it is considered that the fairness to frame passing is not sufficiently ensured despite of the change of the skip flag for the self-policer 200 in the past, and therefore the current situation of the self-policer 200 is maintained.

In this manner, when the self-policer 200 consumes resources in the current period and there is a possibility that another policer cannot consume the resources in the current period, the skip flag is changed to "1", and therefore the self-policer 200 is restricted to consume resources in the following period, and instead, another policer can consume the resources. As a result, the fairness in resource consumption by a plurality of policers can be ensured.

Figure 7:
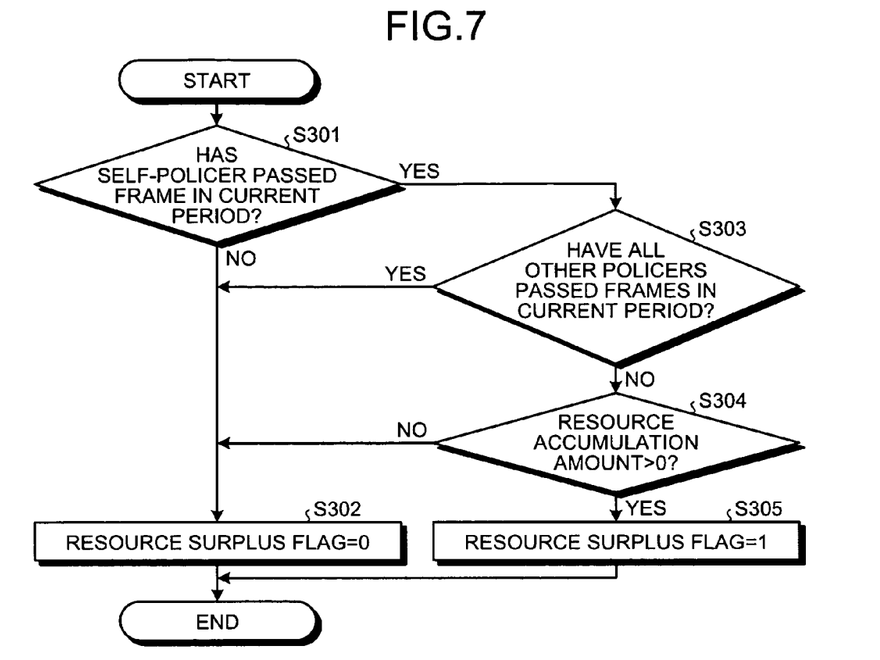
FIG. 7 is a flow chart of resource surplus flag update processing according to the embodiment.

Next, resource surplus flag update processing according to the present embodiment will be explained with reference to the flow chart shown in FIG. 7. The resource surplus flag update processing shown in FIG. 7 is carried out by the flag updating unit 205 when a resource supply timing comes.

First, the flag updating unit 205 refers to the latest passing information in a current period stored in the management information storage unit 204 and judges whether the self-policer 200 has passed a frame during the current period (step S301). From the judgment result, in case that the self-policer 200 has not passed any frame during the current period (No at step S301), it is assumed that the self-policer 200 did not succeed in passing a frame because of exhaustion of resource, and therefore there are no surplus resources, and a resource surplus flag "0" is newly cataloged in the management information storage unit 204 (step S302).

On the other hand, when the self-policer 200 has passed a frame during the current period (Yes at step S301), the flag updating unit 205 refers to the latest passing information in the current period and judges whether all the other policers have passed frames during the current period (step S303). From the judgment result, in case that all the other policers have passed frames during the current period (Yes at step S303), all the policers including the self-policer 200 have passed frames during the current period, and the amount of resources is assumed to be sufficient. Therefore, it is assumed that yielding the resources to another policer by any policer is not necessary in the following period. Accordingly, a resource surplus flag "0" is newly cataloged in the management information storage unit 204 (step S302), thereby not affecting the updating of skip flag at the end of the following period.

Further, when there are some other policers that have not passed any frames during the current period (No at step S303), the flag updating unit 205 judges whether the accumulation amount of resources managed by the resource managing unit 203 is larger than zero (step S304). From the judgment result, when the accumulation amount of resources is equal to or smaller than zero (No at step S304), this means that there are no surplus resources at the end of the current period, and a resource surplus flag "0" is newly cataloged in the management information storage unit 204 (step S302). Further, when the accumulation amount of resources is larger than zero (Yes at step S304), this means that there are surplus resources at the end of the current period, and therefore a resource surplus flag "1" is newly cataloged in the management information storage unit 204 (step S305).

In this manner, when not only the self-policer 200 pass a frame in the current period but also part of the other policers passes frames and the accumulation amount of resources at the end of the current period is larger than zero, the resource surplus flag is changed to "1"; therefore, it can be accurately judged whether the self-policer 200 yields the resources to another policer when the skip flag for the self-policer 200 is updated at the end of the following period.

As described above, according to the present embodiment, when the self-policer has passed a frame during the current period, whereas another policer has not passed any frame and further there were not any surplus resources at the end of the previous period, the skip flag is updated to "1" at a resource supply timing at the end of the current period, and the self-policer yields the resources to another policer in the following period. Because of this, even if resources consumable by the self-policer in the following period are supplied at a resource supply timing, the self-policer does not monopolize the resources in the following period. By carrying out the same processing by the other policers, frames can be fairly passed even when a supply timing of resources consumed by frame passing is independent for every policer.

In each period, when the self-policer or another policer passes a frame, the self-policer subtracts the amount of the resources consumed from the accumulation amount of resources managed by the resource managing unit 203. At this time, when a clock frequency that determines a period for each policer deviates, the clock frequency drifts are accumulated to generate a synchronism deviation more than one period in the long term, resulting in that a policer having a fast clock frequency advantageously passes a frame. Hence, the resource managing unit 203 is required to ignore the frame passing by the policer having a fast clock frequency and whose period deviates from that of the self-policer more than one period and consider that there is no resource consumption.

Figure 8:
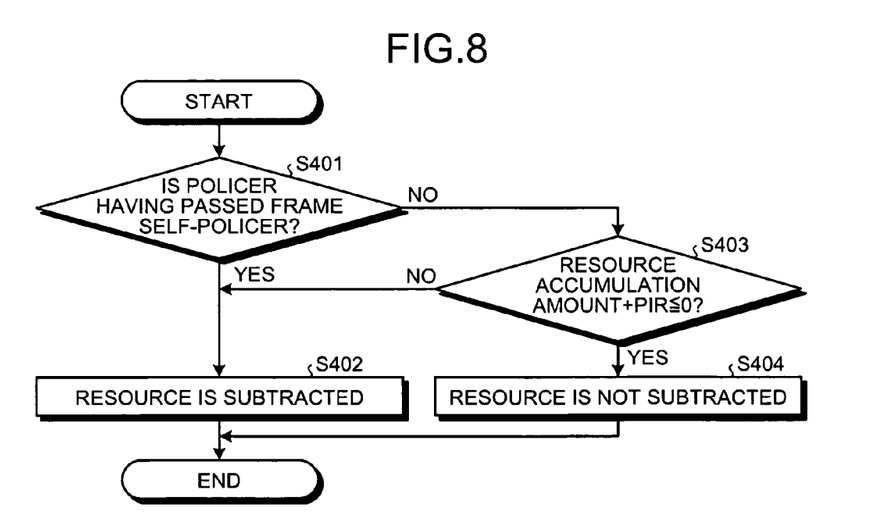
FIG. 8 is a flow chart of an operation of the policer at a resource subtraction timing according to the embodiment.

Because of this, the resource managing unit 203 reflects the resource consumption in a period on the accumulation amount of resources for the self-policer 200 during the period according to the flow chart shown in FIG. 8. That is, the resource managing unit 203 judges whether the policer that has passed a frame is the self-policer 200 (step S401). From the judgment result, when the self-policer 200 has passed the frame (Yes at step S401), the amount of resources consumed by this frame passing is subtracted from the accumulation amount of resources (step S402).

On the other hand, in case that another policer other than the self-policer 200 has passed a frame (No at step S401), the resource managing unit 203 judges whether the value resulted from the addition of a PIR supplied at the following resource supply timing to the current accumulation amount of resources is equal to or smaller than zero (step S403). In other words, at the following resource supply timing, the resource managing unit 203 judges whether the accumulation amount of resources for the self-policer 200 is supposed to recover to a value larger than zero.

From the judgment result, when the accumulation amount of resources is equal to or smaller than zero even if the RIP is added (Yes at step S403), it is assumed that the clock frequency of another policer having passed a frame is faster and that synchronism deviation equal to or more than one period from the period of the self-policer 200 is generated, and therefore the amount of the resource consumed by this frame passing is not subtracted from the accumulation amount of the resources (step S404). Further, when the accumulation amount of the resources becomes larger than zero when the RIP is added (No at step S403), it is assumed that no synchronism deviation more than one period is generated, and therefore the amount of the resources consumed by this frame passing is subtracted from the accumulation amount of the resources (step S402).

Because of this, when the period of another policer whose clock frequency is faster deviates from the period of the self-policer 200 by more than one period, the frame passing by another policer does not affect the accumulation amount of resources for the self-policer 200. As a result, even when synchronism deviation among policers is generated owing to a clock frequency drift of each policer, a specific policer does not pass a frame advantageously, and the fairness can securely be ensured.

The L2 switch provided with the policer 200-1 to 200-$n$ has been explained in the embodiment described above; however, the present invention is not limited to the above. When a plurality of policers carry out bandwidth control, the present invention can be applied similarly to the above embodiment.

Further, in the above embodiment, the method of bandwidth control by the policers 200-1 to 200-$n$ has been explained; however, effects similar to those in the embodiment can be obtained by describing this method of bandwidth control as a bandwidth control program readable by a computer and implementing the bandwidth control program by the computer.

Regarding the above embodiment, the following notes are further disclosed.

According to this configuration, a determination whether passing a frame for the self-policer is allowed in the following period is made for every period between resource supply timings based on the change in the accumulation amount of resources or the passing information, and therefore a policer that has passed a frame and consumed resources during a current period can yield resources to another policer in the following period. As a result, even where a supply timing of resources consumed by frame passing is independent for every policer, frames can be fairly passed.

According to this configuration, when a policer have passed a frame during the current period, the determining unit determines that the self-policer is not allowed to pass a frame in the following period, and therefore, in the following period, the self-policer can yield resources to another policer even though there are consumable resources.

According to this configuration, when all the policers have passed frames by the current period, frame passing by the self-policer is allowed in the following period regardless whether a frame has been passed during the current period. Because of this, in case that all the policers have already passed frames fairly, the self-policer does not stop passing a frame unnecessarily.

According to this configuration, when there were surplus resources at the end of the previous period, frame passing by the self-policer is allowed in the following period regardless whether a frame has passed during the current period. Because of this, when any frame to be passed is not input to another policer in the first place, frame passing by the self-policer is allowed and bandwidth clipping can be prevented.

According to this configuration, when only the same policer has passed frames in a predetermined number of consecutive periods, a determination is made that frame passing by the self-policer is allowed in the following period. Because of this, each policer judges that the policer having passed frames in the consecutive periods is a policer in practical use, and therefore it is possible to prevent unnecessary yielding of resources to the other policers not in use other than the policer in use.

According to this configuration, when there is a shortage of resources at the beginning of the current period, approval or disapproval of frame passing by the own device in the following period is not changed from the current period. Because of this, for example, when a huge frame was passed through any policer and a lot of resources were consumed in the previous period, the current situation can be maintained until the accumulation amount of resources recovers to equal to or larger than zero, and the fairness among the policers can be ensured.

According to this configuration, an amount of resources corresponding to the amount of resources consumed by the self-policer or another policer for frame passing is subtracted from the accumulation amount of resources for the self-policer, and therefore a frame can be passed in the range of resources supplied to the self-policer, and the upper limit of the amount of resources to be consumed can be strictly observed.

According to this configuration, when the sum of the accumulation amount of resources at the present time and an amount of resources supplied is equal to or smaller than zero, an amount of resources consumed is not subtracted from the accumulation amount of resources. Because of this, even when another policer whose clock frequency is faster and in which a synchronism drift equal to or more than one period compared to a period of the self-policer is generated passes a frame, the accumulation amount of resources for the self-policer is not decreased, and monopolizing the resources by another policer whose clock frequency is faster can be prevented.

According to this configuration, by updating the resource surplus flag, the supply filled flag, and the skip flag, approval or disapproval of frame passing by the self-policer is determined, and therefore the fairness among the policers can be securely ensured in a simple device configuration.

According to the above, made is a determination whether frame passing by the self-policer is allowed in a following period for every period between resource supply timings based on the change in the accumulation amount of resources or the passing information, and therefore in case that the self-policer has passed a frame and consumed resources during the current period, the self-policer can yield resources to another policer in the following period. As a result, even where each supply timing of resources consumed by frame passing is independent for every policer, frames can be fairly passed.

According to the policer device and the bandwidth control program disclosed in the present specification, even where each supply timing of resources consumed by frame passing is independent for every policer, frames can be passed fairly.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A policer device comprising:
   a storage unit that stores passing information indicating whether each of the own policer and other policer device has passed a frame in each period between resource supply timings specific to the own policer;
   a managing unit that manages changes in an accumulation amount of resources consumed when the own policer or the other policer device passes a frame;
   a determining unit that determines whether frame passing by the own policer is allowed in a following period after a next resource supply timing based on at least either of the passing information stored by the storage unit or the change in the accumulation amount of resources managed by the managing unit; and
   an output unit that outputs a frame input to the own policer in each period between resource supply timings according to the determination made by the determining unit.

2. The policer device according to claim 1, wherein
   the determining unit determines that when the output unit outputs a frame during a current period including the present time, frame passing by the own policer is not allowed in the following period.

3. The policer device according to claim 2, wherein
   the determining unit determines that when the passing information stored by the storage unit indicates that all the policer devices have passed frames in a predetermined number of periods before the current period, the frame passing by the own policer is allowed in the following period even when a frame is output by the output unit during the current period.

4. The policer device according to claim 2, wherein
   the determining unit determines that when the accumulation amount of resources managed by the managing unit is equal to or larger than zero at the end of the previous period before the previous resource supply timing, the frame passing by the own policer is allowed in the following period even when the frame is output by the output unit during the current period.

5. The policer device according to claim 1, wherein
   the determining unit determines that when the passing information stored by the storage unit indicates that only the same policer device has passed frames in a predetermined number of consecutive periods before the current period, the frame passing by the own policer is allowed in the following period.

6. The policer device according to claim 1, wherein
   the determining unit determines that when the accumulation amount of resources managed by the managing unit is equal to or smaller than zero at the beginning of the current period after the previous resource supply timing, approval or disapproval of the frame passing by the own policer in the following period is given comparably to that in the current period.

7. The policer device according to claim 1, wherein
   the managing unit subtracts a consumption amount of resources consumed by frame passing at the time when the own policer or the other policer device passes a frame from the accumulation amount of resources.

8. The policer device according to claim 7, wherein
   the managing unit does not subtract a consumption amount of resources from the accumulation amount of resources even when the other policer device passes a frame when the sum of the accumulation amount of resources at the present time and a constant amount of resources supplied at a resource supply timing is equal to or smaller than zero.

9. The policer device according to claim 1, wherein
   the determining unit includes a flag storage unit that stores a source surplus flag indicating whether an accumulation amount of resources is equal to or larger than zero before a resource supply timing, a supply filled flag indicating whether the accumulation amount of resources is equal to or larger than zero after the resource supply timing, and a skip flag indicating whether frame passing by the own policer is allowed; and
   determines whether the frame passing by the own policer is allowed in the following period by updating the flag stored by the storage unit.

10. A non-transitory computer readable recording medium including programmed instructions, wherein the instructions, when executed by a computer provided with a plurality of policers, cause the computer to perform:
    obtaining passing information indicating whether each of a first policer and a second policer has passed a frame in each period between resource supply timings specific to the first policer;
    obtaining a change in an accumulation amount of resources consumed when the first policer or the second policer passes a frame;
    determining whether frame passing by the first policer is allowed in a following period after a next resource supply timing based on the passing information or the change in the accumulation amount of resources; and
    outputting the frame input to the first policer in the following period between resources supply timings according to at the determining,
    the determining including determining that the frame passing is not allowed in the following period to yield resources to the second policer, when the passing information of a current period indicates that the first policer has passed the frame in the current period and the change in the accumulation amount of resources shows that there were not any surplus resources at the end of a previous period before a last resource supply tinning.

11. A method for controlling a bandwidth in a first policer device provided in a same device together with a second policer device, the method comprising:
    obtaining passing information indicating whether each of the first policer and the second policer has passed a frame in each period between resource supply timings specific to the first policer;
    obtaining a change in an accumulation amount of resources consumed when the first policer or the second policer passes a frame;
    determining whether frame passing by the first policer is allowed in a following period after a next resource supply timing based on the passing information or the change in the accumulation amount of resources; and
    outputting the frame input to the first policer in the following period between resources supply timings according to at the determining,
    the determining including determining that the frame passing is not allowed in the following period to yield resources to the second policer, when the passing information of a current period indicates that the first policer has passed the frame in the current period and the change in the accumulation amount of resources shows that there were not any surplus resources at the end of a previous period before a last resource supply timing.

12. The policer device according to claim 1, wherein the determining unit determines that the frame input passed is not allowed in the following period to yield resources to the other policer when the passing information of a current period indicates that the own policer has passed the frame in the current period and the change in the accumulation amount of resources shows that there were not any surplus resources at the end of a previous period before a last resource supply timing.

* * * * *